US012623769B2

(12) United States Patent
Winkler et al.

(10) Patent No.: US 12,623,769 B2
(45) Date of Patent: May 12, 2026

(54) TRANSMISSION LOSS PANEL FOR AIRCRAFT CABIN NOISE AND THERMAL TREATMENT

(71) Applicant: B/E Aerospace, Inc., Winston-Salem, NC (US)

(72) Inventors: Julian Winkler, Glastonbury, CT (US); Brian E. St. Rock, Andover, CT (US); Maxime Dempah, Atlanta, GA (US); Thomas Martz, Winston-Salem, NC (US); Matthew R. Pearson, Hartford, CT (US)

(73) Assignee: B/E Aerospace, Inc., Winston-Salem, NC (US)

( * ) Notice: Subject to any disclaimer, the term of this patent is extended or adjusted under 35 U.S.C. 154(b) by 197 days.

(21) Appl. No.: 18/416,094

(22) Filed: Jan. 18, 2024

(65) Prior Publication Data

US 2024/0262488 A1     Aug. 8, 2024

Related U.S. Application Data

(60) Provisional application No. 63/444,008, filed on Feb. 8, 2023.

(51) Int. Cl.
*B64C 1/40*     (2006.01)
*B64C 1/06*     (2006.01)
*G10K 11/172*     (2006.01)

(52) U.S. Cl.
CPC ................ *B64C 1/40* (2013.01); *B64C 1/066* (2013.01)

(58) Field of Classification Search
CPC .... G10K 11/16; G10K 11/168; G10K 11/172; E04B 2001/8428; E04B 2001/8433;
(Continued)

(56) References Cited

U.S. PATENT DOCUMENTS 2,000,806 A * 5/1935 White ................... G10K 11/175
                                                             367/1
2,159,488 A * 5/1939 Parkinson ................. E04B 1/82
                                                             52/145
(Continued)

FOREIGN PATENT DOCUMENTS

CA          2359924 C       3/2012
CA          2856105 C       5/2019
(Continued)

OTHER PUBLICATIONS

European Search Report received in EP Application No. 24156636, Jul. 4, 2024, 6 pages.

*Primary Examiner* — Edgardo San Martin

(74) *Attorney, Agent, or Firm* — Suiter Swantz IP

(57)          ABSTRACT

A vehicle panel includes two sidewalls and a resonator disposed between them on one of the cell walls. The resonator includes a network of cells, each cell defines an internal space to absorb and dissipate noise and vibrations within a specific frequency range. Certain cells or subsets of cells may be interconnected to define a larger internal cell space. An airgap between the resonator and one of the sidewalls may be partially or completely filled with dampening material to absorb high frequency noise. The dampening material may also provide thermal insulation.

20 Claims, 11 Drawing Sheets

(58) Field of Classification Search
CPC ..... E04B 2001/8423; E04B 2001/8485; E04B
2001/848; E04B 2001/8476; B32B 3/12;
B32B 2307/10; B32B 2307/102; B32B
2605/18; F02K 1/82; F02K 1/827; F02C
7/24; F02C 7/045; B64D 33/06; B64D
2033/0206; B64C 1/40; B64C 1/066
See application file for complete search history.

(56) References Cited

U.S. PATENT DOCUMENTS

| | | | |
|---|---|---|---|
| 2,840,179 A | | 6/1958 | Junger |
| 2,887,173 A | * | 5/1959 | Boschi .................... E04B 9/001 |
| | | | 428/137 |
| 3,597,891 A | * | 8/1971 | Martin ................... B62D 29/04 |
| | | | 52/794.1 |
| 3,834,487 A | * | 9/1974 | Hale ...................... E04C 2/3405 |
| | | | 428/116 |
| 3,851,724 A | * | 12/1974 | Banks, Jr. .............. G10K 11/16 |
| | | | 181/208 |
| 4,291,080 A | | 9/1981 | Ely et al. |
| 4,298,090 A | * | 11/1981 | Chapman ................ F02K 1/827 |
| | | | 181/292 |
| 4,421,201 A | | 12/1983 | Nelsen et al. |
| 4,600,078 A | * | 7/1986 | Wirt ..................... G10K 11/172 |
| | | | 181/290 |
| 5,004,070 A | * | 4/1991 | Wang ........................ E04B 1/86 |
| | | | 181/292 |
| 5,185,504 A | * | 2/1993 | Jen ........................... E04B 1/86 |
| | | | 181/292 |
| 6,158,690 A | | 12/2000 | Wadey et al. |
| 6,290,022 B1 | * | 9/2001 | Wolf ................... G10K 11/172 |
| | | | 181/295 |
| 7,337,875 B2 | * | 3/2008 | Proscia .................... F02C 7/24 |
| | | | 181/290 |
| 8,464,831 B2 | * | 6/2013 | Olander Burak ....... F01D 9/041 |
| | | | 181/290 |
| 8,657,067 B1 | * | 2/2014 | Mathur ................ B32B 27/308 |
| | | | 181/290 |
| 8,789,651 B2 | * | 7/2014 | Kawai .................. G10K 11/172 |
| | | | 181/290 |
| 9,248,899 B2 | | 2/2016 | Caillet et al. |
| 9,270,253 B2 | | 2/2016 | Chang et al. |
| 9,284,727 B2 | | 3/2016 | Mcknight et al. |
| 10,332,501 B2 | * | 6/2019 | Lin .......................... B32B 7/12 |
| 10,851,713 B2 | * | 12/2020 | Roach .................... B64D 29/00 |
| 10,978,036 B2 | * | 4/2021 | Kim ..................... G10K 11/168 |
| 11,028,774 B2 | | 6/2021 | Piccirelli |
| 11,227,576 B2 | * | 1/2022 | Lin ...................... B32B 15/092 |

| | | | |
|---|---|---|---|
| 11,315,538 B2 | | 4/2022 | Mckinley et al. |
| 11,434,826 B2 | | 9/2022 | Riou et al. |
| 11,524,792 B2 | | 12/2022 | Simon |
| 11,719,192 B2 | | 8/2023 | Le Boulicaut et al. |
| 11,781,485 B2 | | 10/2023 | Winkler et al. |
| 12,083,778 B2 | * | 9/2024 | Cariou .................... F02K 1/827 |
| 12,305,387 B2 | * | 5/2025 | Jeon ......................... E04B 1/86 |
| 2006/0289229 A1 | * | 12/2006 | Yamaguchi .......... G10K 11/172 |
| | | | 181/290 |
| 2007/0272482 A1 | * | 11/2007 | Yamaguchi .......... G10K 11/172 |
| | | | 181/290 |
| 2017/0341186 A1 | * | 11/2017 | Hakuta ................ G10K 11/162 |
| 2019/0063318 A1 | | 2/2019 | Roach et al. |
| 2019/0213990 A1 | * | 7/2019 | Jonza ...................... B32B 3/266 |
| 2019/0272812 A1 | | 9/2019 | Lin et al. |
| 2022/0177152 A1 | | 6/2022 | Vercellesi |
| 2022/0355566 A1 | | 11/2022 | Cariou |
| 2022/0364514 A1 | | 11/2022 | Winkler et al. |
| 2023/0088770 A1 | | 3/2023 | Mercat et al. |
| 2023/0349151 A1 | * | 11/2023 | Lee ...................... G10K 11/172 |
| 2024/0262066 A1 | * | 8/2024 | Winkler ................... B32B 7/12 |

FOREIGN PATENT DOCUMENTS

| | | | | | |
|---|---|---|---|---|---|
| CA | 2983082 | C | | 3/2023 | |
| CN | 204645298 | U | * | 9/2015 | |
| CN | 107514066 | A | * | 12/2017 | .............. E04B 1/86 |
| CN | 109533269 | A | | 3/2019 | |
| CN | 214986013 | U | | 12/2021 | |
| CN | 217994767 | U | | 12/2022 | |
| CN | 117809611 | A | * | 4/2024 | .......... G10K 11/162 |
| DE | 2506472 | A1 | | 8/1976 | |
| DE | 3733285 | C2 | * | 2/1994 | ........ B60R 13/0869 |
| EP | 2472509 | B1 | | 11/2013 | |
| EP | 2274740 | B1 | | 10/2015 | |
| EP | 3500427 | B1 | | 2/2021 | |
| EP | 3848926 | A1 | | 7/2021 | |
| EP | 4070306 | A1 | | 10/2022 | |
| EP | 4220624 | A1 | | 8/2023 | |
| EP | 4243009 | A3 | | 11/2023 | |
| EP | 4279261 | A1 | | 11/2023 | |
| FR | 2700179 | A1 | * | 7/1994 | .............. E04B 1/86 |
| FR | 2959056 | B1 | | 5/2015 | |
| JP | S61249853 | A | * | 11/1986 | |
| JP | 2001003482 | A | * | 1/2001 | |
| JP | 2005099402 | A | * | 4/2015 | |
| JP | 7278048 | B2 | | 5/2023 | |
| KR | 20080091621 | A | * | 10/2008 | ........... E04F 15/206 |
| KR | 20200030413 | A | * | 3/2020 | .......... G10K 11/172 |
| WO | 2015023389 | A1 | | 2/2015 | |
| WO | 2023275838 | A1 | | 1/2023 | |

* cited by examiner

SINGLE RESONATOR

TRIPLE RESONATOR

614

620

616

618

HYBRID

LARGE RESONATOR TO ENCLOSE
VOLUME OUTSIDE OF CONES

EXTENDED NECK

TRANSMISSION LOSS PANEL FOR AIRCRAFT CABIN NOISE AND THERMAL TREATMENT

PRIORITY

The present application claims the benefit under 35 U.S.C. § 119(e) of U.S. Provisional App. No. 63/444,008 (filed Feb. 8, 2023), which is incorporated herein by reference.

BACKGROUND

Vehicle interiors suffer from noise transmission and a lack of thermal insulation. Such noise may be external (engine noise and the like) or internal (noise from passengers and galley or lavatory equipment). Noise impacts the comfort and health of personnel in commercial aircraft, business jets, military jets, helicopters, urban air-mobility concepts, submarines, aircraft carriers, etc. Modern turboprop engines cause low-frequency noise transmission into the cabin. In many instances there is insufficient paneling to reduce the noise level inside the cabin. Some applications require dual thermal and acoustic/vibration reduction. It would be advantageous to have multifunctional panel solution to reduce noise in a variety of applications, and provide thermal insulation.

SUMMARY

In one aspect, embodiments of the inventive concepts disclosed herein are directed to an aircraft panel with two sidewalls and a resonator disposed between them on one of the cell walls. The resonator includes a network of cells, each cell defines an internal space to absorb and dissipate noise and vibrations within a specific frequency range.

In a further aspect, certain cells or subsets of cells may be interconnected to define a larger internal cell space.

In a further aspect, an airgap between the resonator and one of the sidewalls may be partially or completely filled with dampening material to absorb high frequency noise. The dampening material may also provide thermal insulation.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
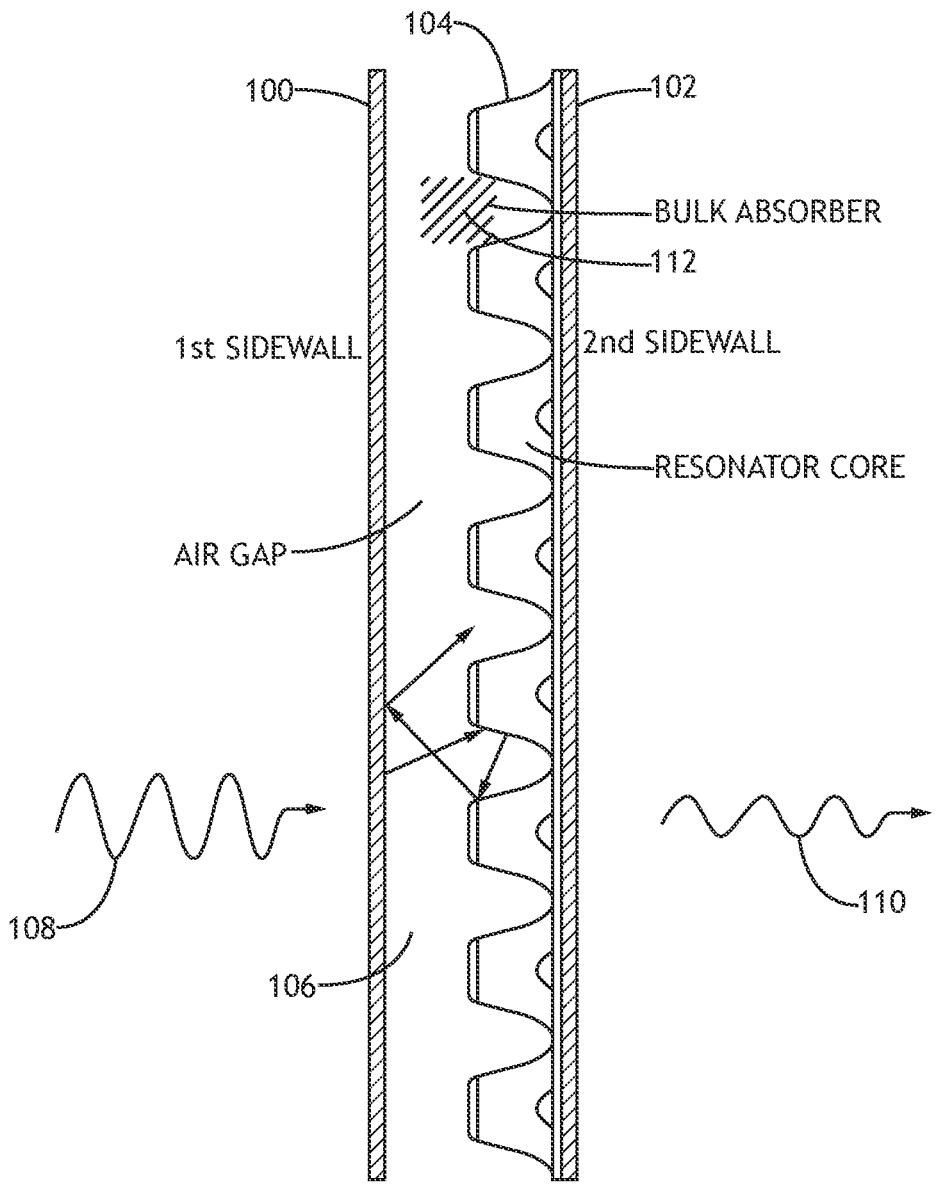
FIG. 1 shows a partial side view of a panel according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to an aircraft panel with two sidewalls and a resonator disposed between them on one of the cell walls. The resonator includes a network of cells, each cell defines an internal space to absorb and dissipate noise and vibrations within a specific frequency range. Certain cells or subsets of cells may be interconnected to define a larger internal cell space. An airgap between the resonator and one of the sidewalls may be partially or completely filled with dampening material to absorb high frequency noise. The dampening material may also provide thermal insulation.

Referring to FIG. 1, a partial side view of a panel according to an exemplary embodiment is shown. In at least one embodiment, the panel includes a first sidewall 100 disposed externally, or proximal to an external surface, to a mobile platform. The first sidewall 100 receives external noise 108 that may be within certain known frequency ranges. Such external noise 108 induces vibrations in the first sidewall 100 which are transmitted to an airgap 106 defined by the first sidewall 100 and a resonator 104 disposed on a second sidewall 102.

The double sidewall 100, 102 panel, resonator 104 core, and airgap 106 dampen the external noise 108 via acoustic reflection and energy absorption within the resonator 104, and transmit reduced noise 110 into the interior of the mobile platform. In at least one embodiment, the first sidewall 100 may comprise an external surface of a mobile platform and the second sidewall 102 may define a cabin surface.

In at least one embodiment, the resonator 104 may be a thermal formed material such as a thermoplastic. It may be appreciated that within certain mobile platforms, there are material constraints based on flammability and toxicity. Embodiments of the present disclosure are directed to certain geometries of the resonator 104 rather than specific materials as more fully described herein.

Figures 2A, 2B:
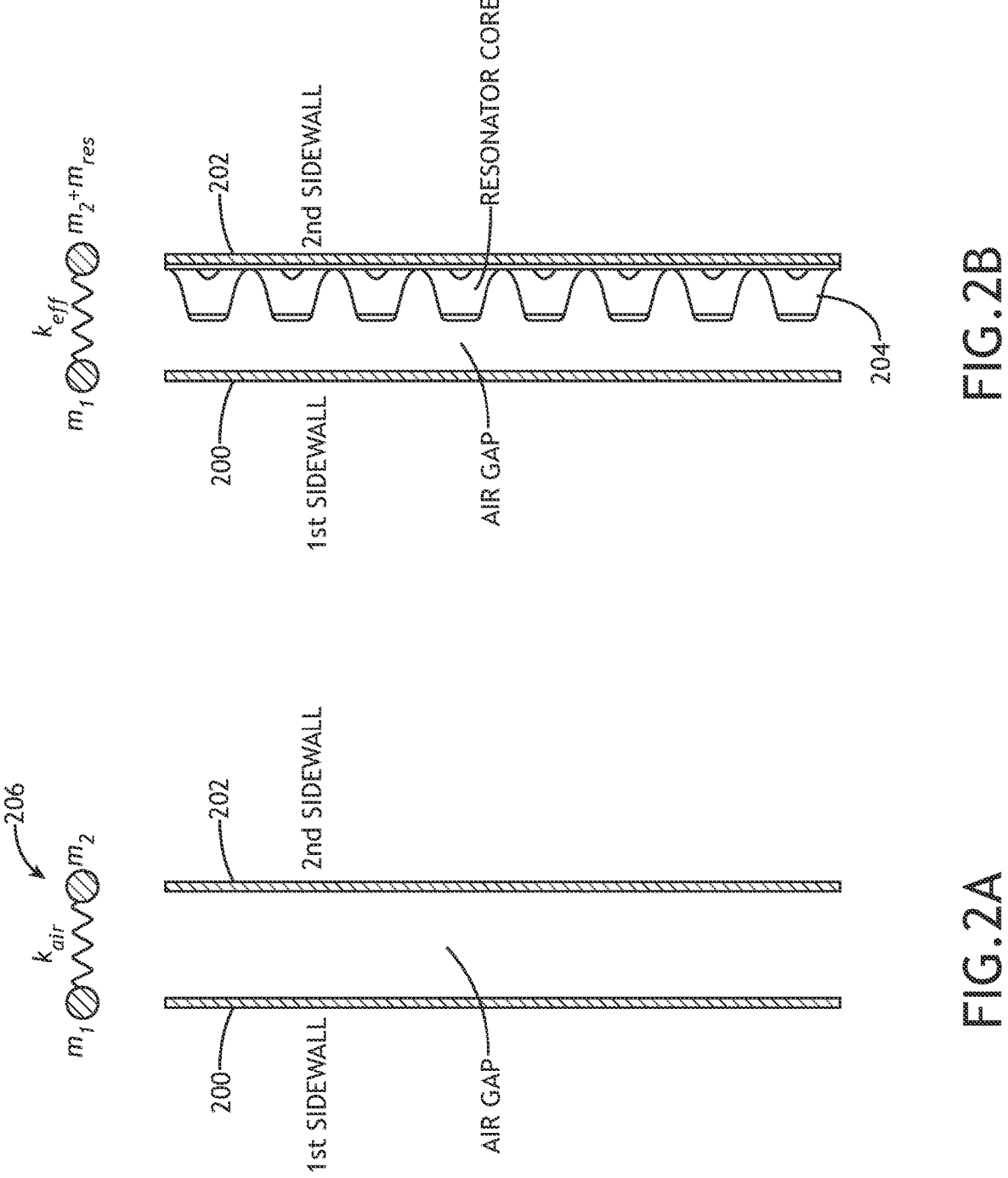
FIG. 2A shows a partial side view of a panel.
FIG. 2B shows a partial side view of a panel according to an exemplary embodiment.

Referring to FIGS. 2A-2B, partial side views of panels with and without a resonator 204 according to an exemplary embodiment are shown. Traditionally, sidewalls 200, 202 defining an airgap function as a mass-spring-mass system 206; sound waves interact with the first sidewall 200 that vibrates and transmits the sound waves into the panel and across to the second sidewall 202. Both sidewalls act as vibrating masses that are coupled through the air space between them, that acts as a spring and is characterized by its stiffness. In at least one embodiment, the resonator 204 changes the stiffness of the space between the sidewalls 200,

202 and thereby alters the characteristics of the mass-spring-mass system to absorb acoustic energy and reduce the noise transferred across the panel.

In at least one embodiment, the resonator 204 defines a geometry to tune the panel over certain target frequencies and/or a frequency range to minimize or reduce the transmission. Furthermore, sound waves may enter at oblique angles. The resonator 204 defines surfaces to produce reflections inside the panel that reflect until they finally transmit to the second sidewall 202.

Figure 3A:
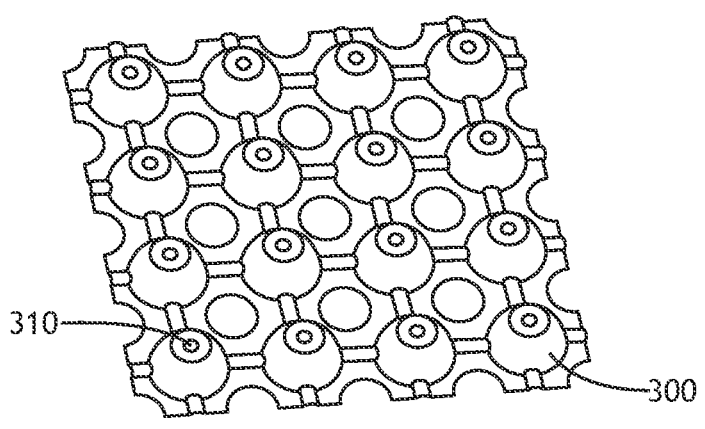
FIG. 3A shows a partial perspective view of a resonator according to an exemplary embodiment.
Figure 3B:
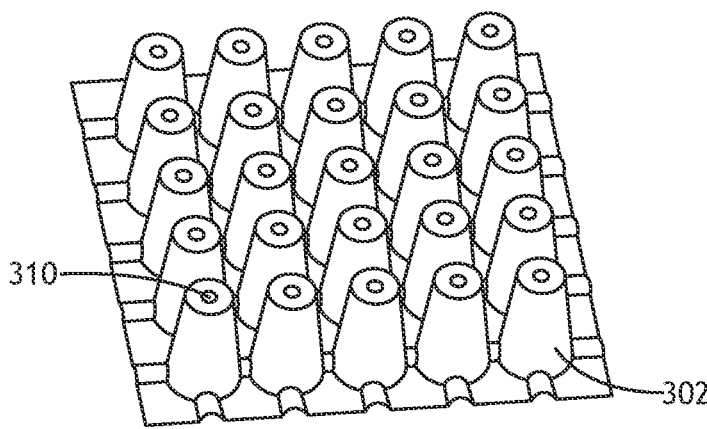
FIG. 3B shows a partial perspective view of a resonator according to an exemplary embodiment.
Figure 3C:
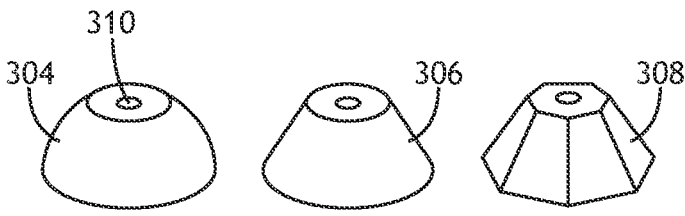
FIG. 3C shows perspective views of resonator cells according to exemplary embodiments.

Referring to FIGS. 3A-3C, partial perspective views of resonators 300, 302 and resonator cells 304, 306, 308 according to exemplary embodiments are shown. A resonator 300, 302 according to at least one embodiment comprises a plurality of regularly spaced cells 304, 306, 308. Each cell 304, 306, 308, or some subset of cells 304, 306, 308, defines an opening 310 (such as a hole of some appropriate shape) to allow air internal to the cell 304, 306, 308 to enter and leave the corresponding cell 304, 306, 308 in response to acoustic pressure waves.

In at least one embodiment, the cells 304, 306, 308 may comprise a substantially hemispherical geometry (as shown by a first cell 304), a conical geometry (as shown by a second cell 306), a faceted geometry (as shown by a third cell 308), or the like. Different cell shapes may define tunable features to allow the resonator 300, 302 to function efficiently in response certain desirable frequency ranges.

Figure 4A:
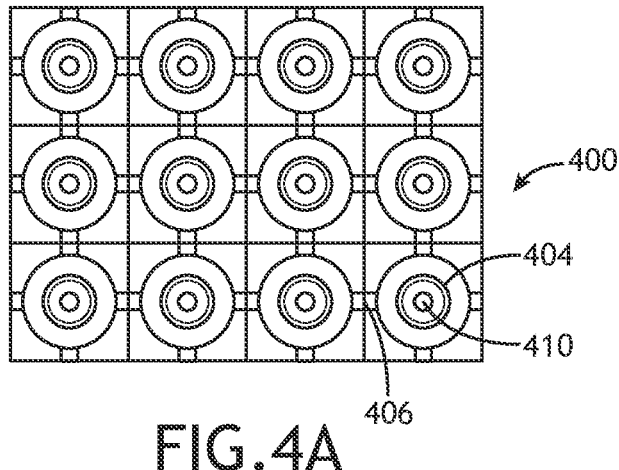
FIG. 4A shows a partial top view of a resonator according to an exemplary embodiment.
Figure 4B:
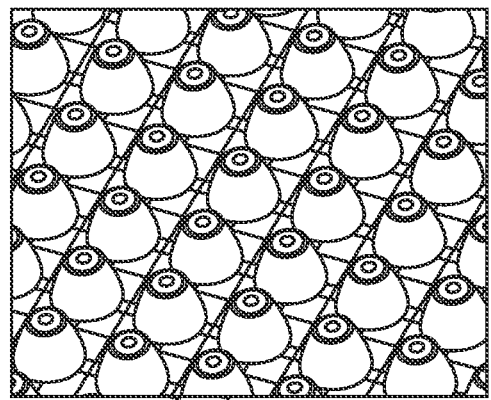
FIG. 4B shows a partial perspective view of a resonator according to an exemplary embodiment.
Figure 4C:
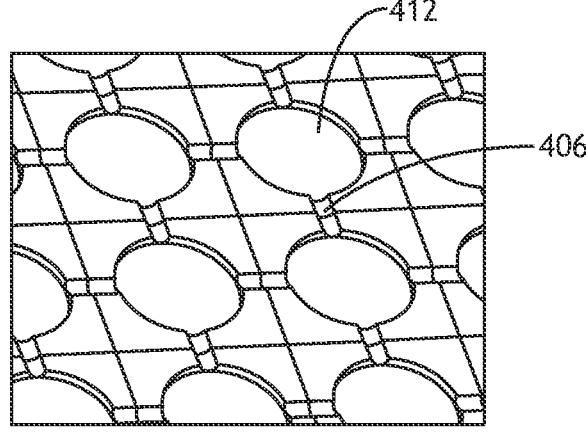
FIG. 4C shows a partial bottom view of a resonator according to an exemplary embodiment.

Referring to FIGS. 4A-4C, partial top, perspective, and bottom views of a resonator 400 according to an exemplary embodiment are shown. The resonator 400 comprises a plurality of regularly spaced cells 404, some or all of the cells defining an opening 410 (hole) to allow air to enter and leave an internal space in response to acoustic pressure waves. In at least one embodiment, cells 404 may be in fluid communication with neighboring cells 404 via a duct 406 formed in the sheet defining the cells 404.

In at least one embodiment, each cell 404 may define an opening 412 in the surface proximal to a sidewall where the resonator is disposed. It may be appreciated the resonator 400 may be comprises of a single sheet formed into the plurality of cells 404. It may be further appreciated that the resonator 400 may be formed via thermoforming, additive manufacturing, or the like.

Figure 5A:
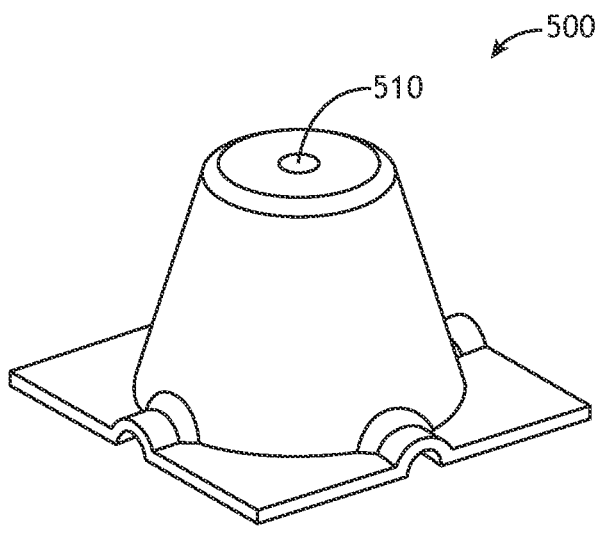
FIG. 5A shows a perspective view of a resonator cell according to an exemplary embodiment.
Figure 5B:
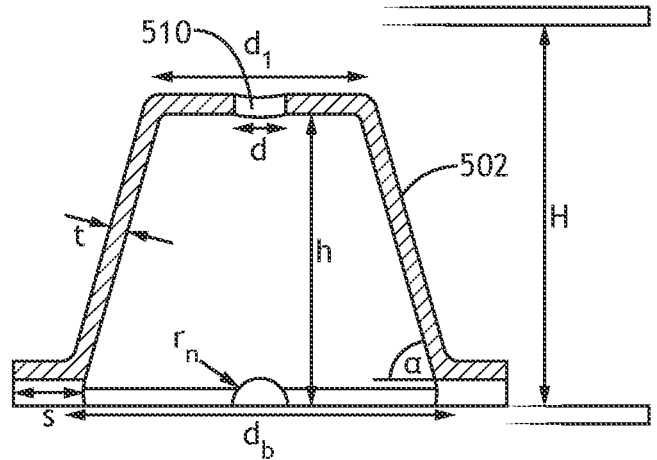
FIG. 5B shows a side cross-sectional view of a resonator cell according to an exemplary embodiment.

Referring to FIGS. 5A-5B, perspective and side, cross-sectional views of a resonator cell 500 according to an exemplary embodiment are shown. The resonator cell 500 comprises a geometry defined by a height, a width (or diameter), an angle of the cell wall 502, and thickness of the cell wall 502. The features of the resonator cell 500 define a volume of air inside. An opening 510 in the cell wall 502, which may be disposed in a top surface of the resonator cell 500, allows air to move in and out of the volume. The shape and characteristics of the resonator cell 500 define the features of a mass-spring damper. Acoustic waves induce the motion of a slug of air inside the hole 510 (mass effect), which in turn compresses the air inside the volume that is enclosed by the walls 502 (spring force). Acoustic absorption (damping effect) takes place in the hole 510 through friction losses from the air movement and in the flow itself.

In at least one embodiment, the resonator cell 500 may include one or more ducts 506 connecting the internal air volume of the resonator cell 500 to one or more resonator cells 500.

Features of the resonator cell 500, include the size of the opening 510, define the dampening characteristics of the resonator cell 500 (or set of resonator cells 500 in fluid communication via one or more ducts 506). Such features may be determined at the time of manufacture according to a desired frequency or frequency range. In at least one embodiment, the features of the resonator cell 500 may be defined with respect certain features of the panel including the resonator cell 500. For example, a resonator cell 500 may have a height between 15% and 95% of the space between a first sidewall and a second sidewall (to produce a smaller or larger airgap).

Figure 6A:
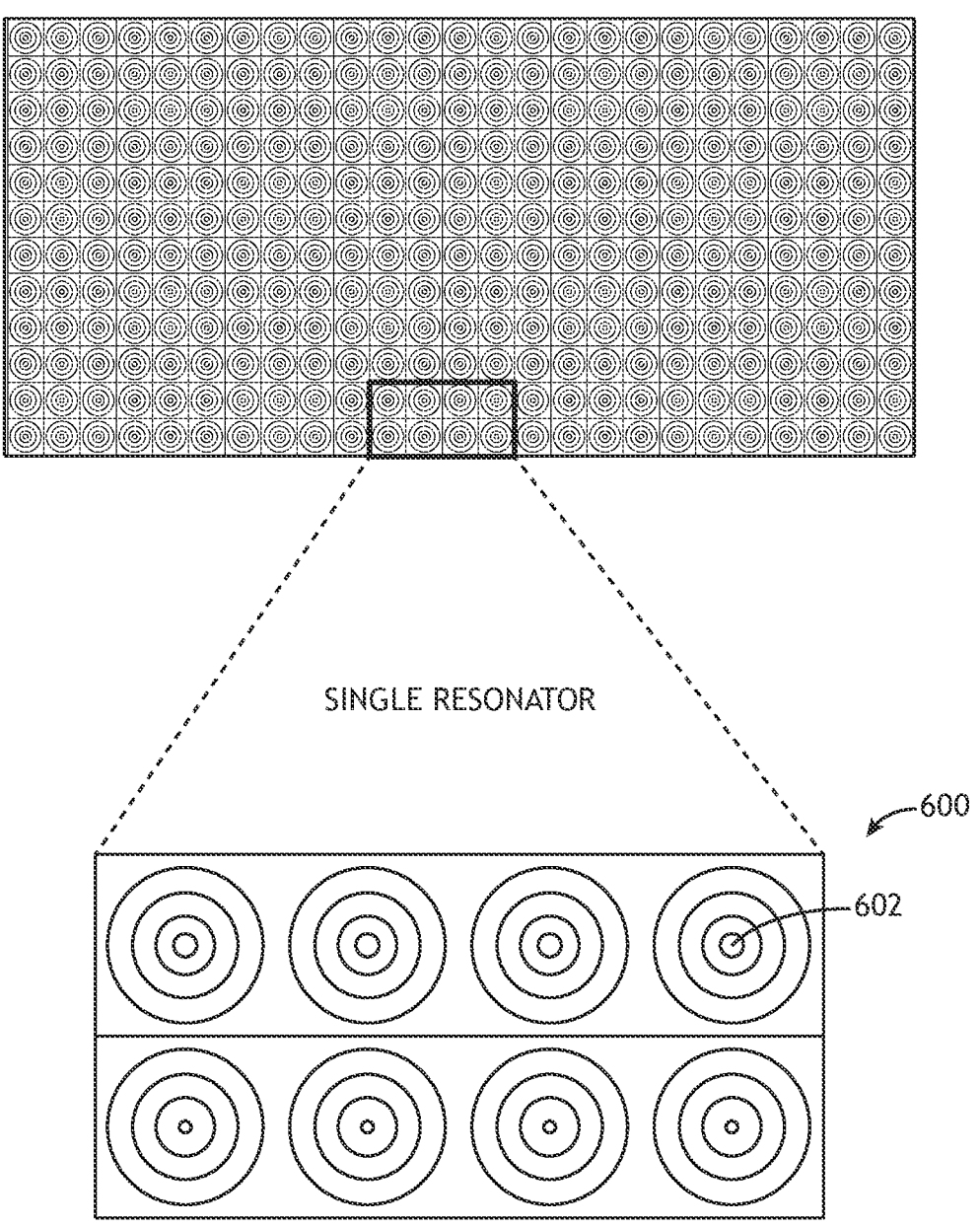
FIG. 6A shows a top view of resonator cells according to an exemplary embodiment.
Figure 6B:
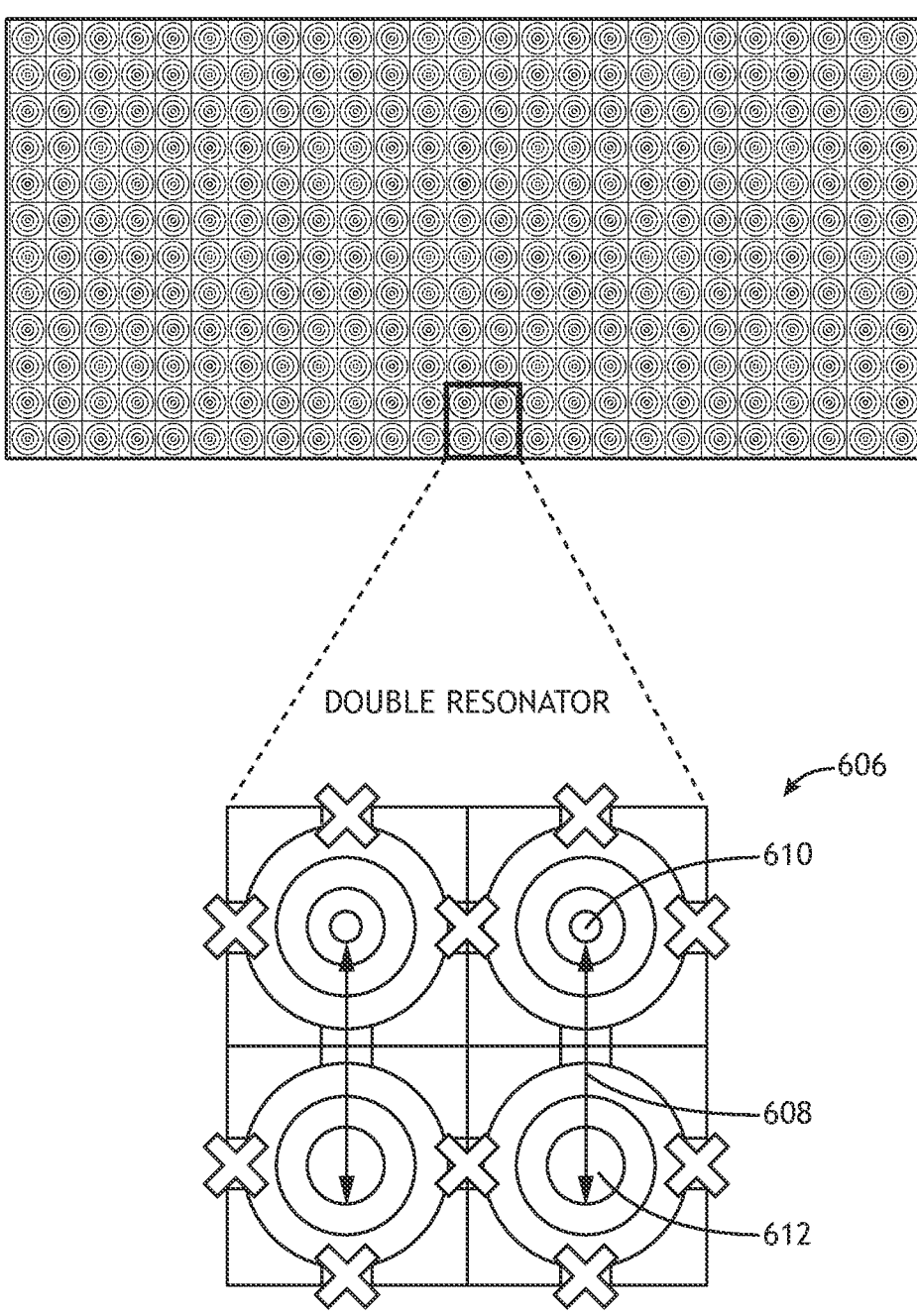
FIG. 6B shows a top view of resonator cells according to an exemplary embodiment.
Figure 6C:
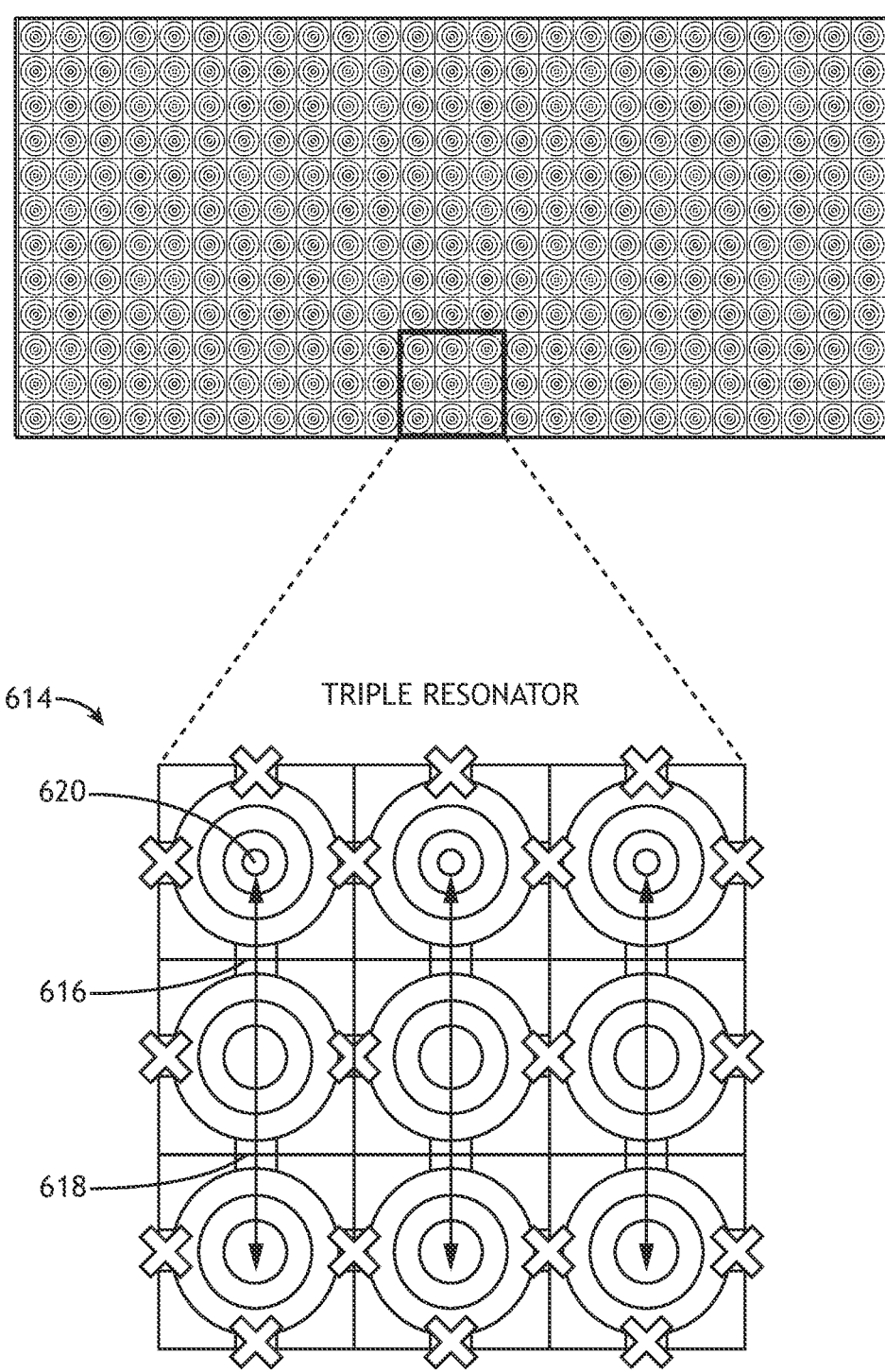
FIG. 6C shows a top view of resonator cells according to an exemplary embodiment.

Referring to FIGS. 6A-6C, top views of resonator cells 600, 606, 614 according to exemplary embodiments are shown. In at least one embodiment, resonator cells 600 may be organized into sets of resonator cells 600 with distinct openings 602, 604. For example, a first set of resonator cells 600 may define openings 602 with a first diameter while a second set of resonator cells 600 defines openings 604 with a second diameter. Differing diameter openings 602, 604 may alter the acoustic dampening properties of the resonator cells 600 such that the different sets of resonator cells 600 are optimized for different frequencies, allowing the acoustic panel to reduce sound transmission over a broader frequency range.

In at least one embodiment, each resonator cells 606 may be connected to a neighboring resonator cell 606 via a duct 608. In such embodiments, one of the connected resonator cells 606 may define an opening 610 while the other resonator cell 606 defines a closed top surface 612. The combined resonator cells 606 define a singular internal air volume, distributed across the two resonator cells 606. Likewise, three or more resonator cells 614 may be similarly connected via ducts 616, 618 to neighboring resonator cells 614, where only one of the connected resonator cells 614 defines an opening 620. Multiple resonator cells 606, 614 connected via ducts 608, 616, 618 may create a system of resonator cells 606, 614 with multiple resonance frequencies, lower than the resonance frequency of any single resonator cell 606, 614. Interconnected resonator cells 606, 614 act like a mass-spring-mass-spring system and provide additional degrees of freedom and frequencies for turning. This configuration is particularly suited for addressing low frequency tones.

It may be appreciated that a single resonator may include multiple type of resonator cell 600, 606, 614 configurations to tune the resonator based on desired operating frequencies. In at least one embodiment, during manufacture, resonator cells 600, 606, 614 and ducts 608, 616, 618 may be formed in a regular, contiguous layer. Openings 602, 604, 610, 620 of various sizes may then be cut or stamped into a top surface of certain resonator cells 600, 606, 614. Likewise, certain ducts may be pinched off or otherwise sealed were not desirable. Alternatively, only those ducts 608, 616, 618 that are desired may be formed in a subsequent process.

Figure 7:
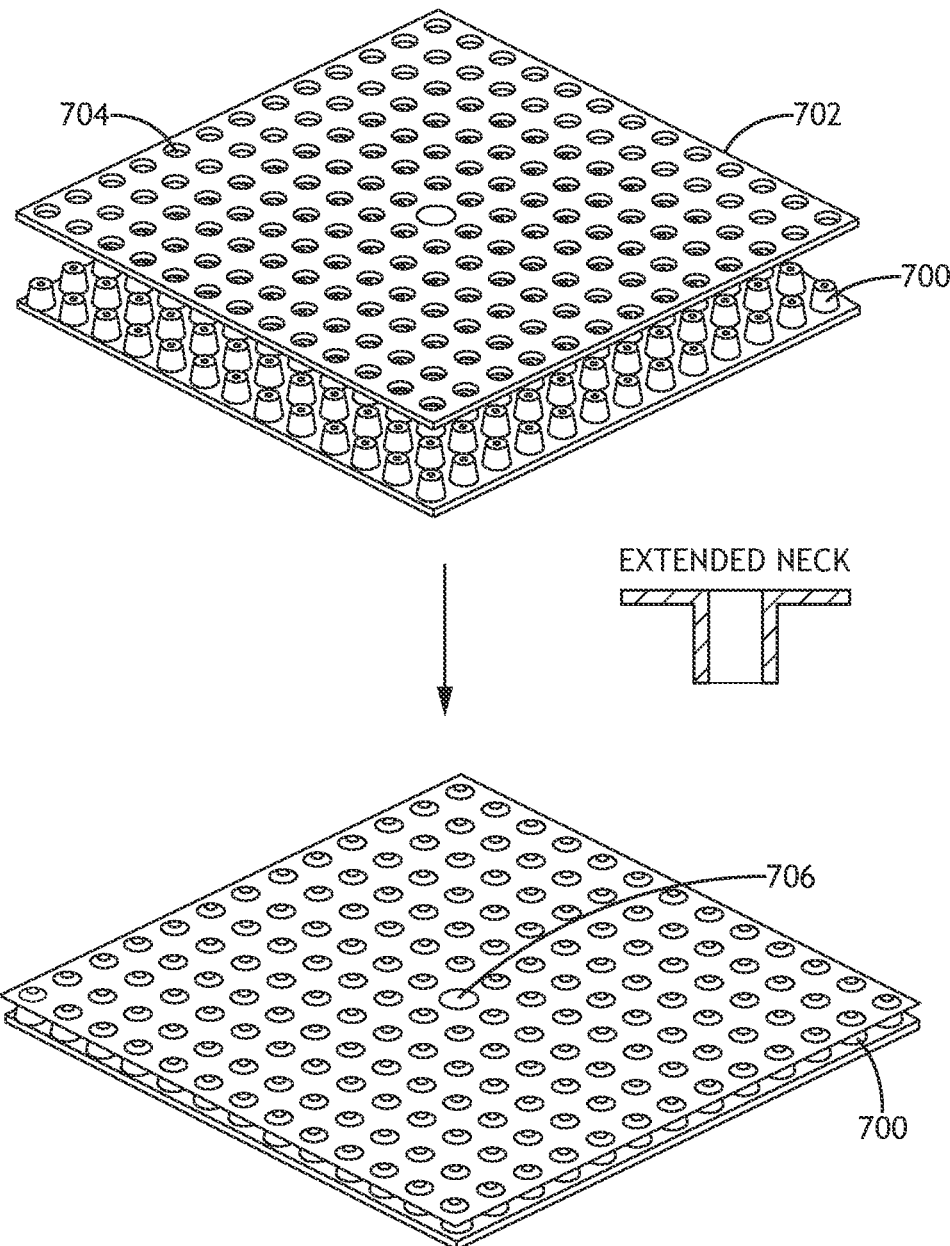
FIG. 7 shows a perspective view of a resonator according to an exemplary embodiment.

Referring to FIG. 7, a perspective view of a resonator 700 according to an exemplary embodiment is shown. In at least one embodiment, the resonator 700 includes a plurality of resonator cells as described herein. A sheet layer 702 includes a plurality of openings 704, each corresponding to one of the resonator cells. The sheet layer 702 surrounds a top portion of each resonator cell and forms a substantially air tight surface. The sheet layer 702 defines an internal airspace, separate from the internal airspace defined by each resonator cell.

In at least one embodiment, one or more resonator cells may be removed from the resonator 700 so that the corresponding opening 704 in the membrane layer 702 is open to airgap defined by the first sidewall. Such opening 706 is conceptually similar the resonator cell openings described herein, for the air volume defined by the internal space between the membrane layer 702 and the resonator 700. Such embodiments may function for very low frequencies.

Figures 8A, 8B, 8C:
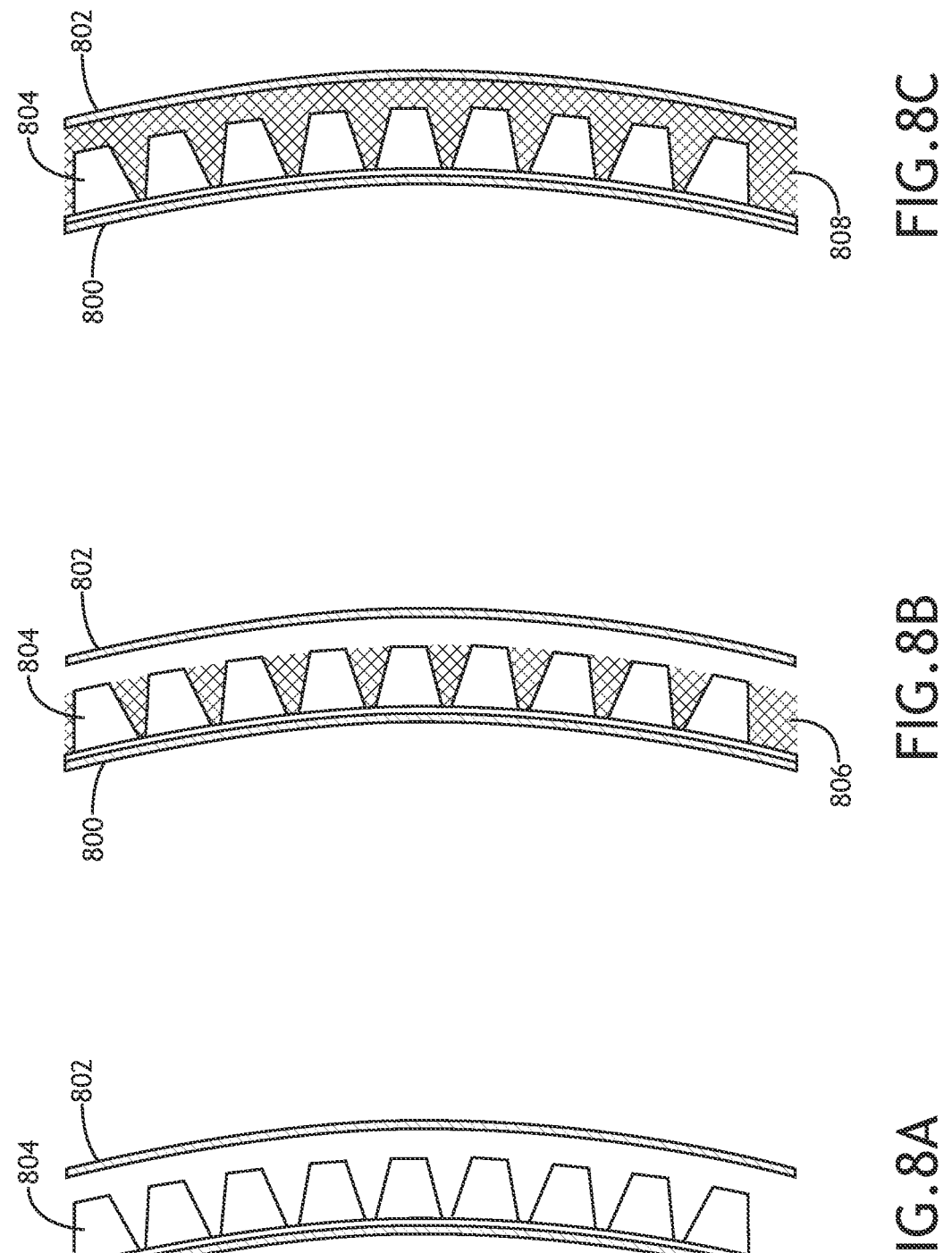
FIG. 8A shows a partial side view of a panel according to an exemplary embodiment.
FIG. 8B shows a partial side view of a panel according to an exemplary embodiment.
FIG. 8C shows a partial side view of a panel according to an exemplary embodiment.

Referring to FIGS. 8A-8C, partial side views of panels according to exemplary embodiments are shown. Each panel includes a first sidewall 800, a second sidewall 802, and a resonator 804 disposed on the second sidewall as described herein. The first sidewall 800 and resonator 804 define an airgap. In at least one embodiment (such as in FIG. 8A), the airgap is unencumbered.

In at least one embodiment (as in FIG. 8B), the airgap may be partially filled with a bulk absorber 806. Such bulk absorber 806 may comprise a foam, aerogel, or other material outside of the outside of the resonator 804. Furthermore, in at least one embodiment (such as in FIG. 8C), the entire airgap may be filled with a bulk absorber 808.

Such bulk absorber 806, 808 may comprise a porous material that may include certain acoustic properties to absorb or dampen frequencies higher than those absorbed or dampened by the resonator 804. Such bulk absorbers 806, 808 may be more efficient at absorbing such frequencies than the resonator 804. In at least one embodiment, the bulk absorber 806, 808 may include certain thermal properties to act as a thermal insulator.

In at least one embodiment, the first sidewall 800, second sidewall 802, and resonator 804 may be curved according to an exterior surface of a mobile platform. Furthermore, it may be appreciated that the first sidewall 800 may comprise the exterior surface of the mobile platform.

Figure 9:
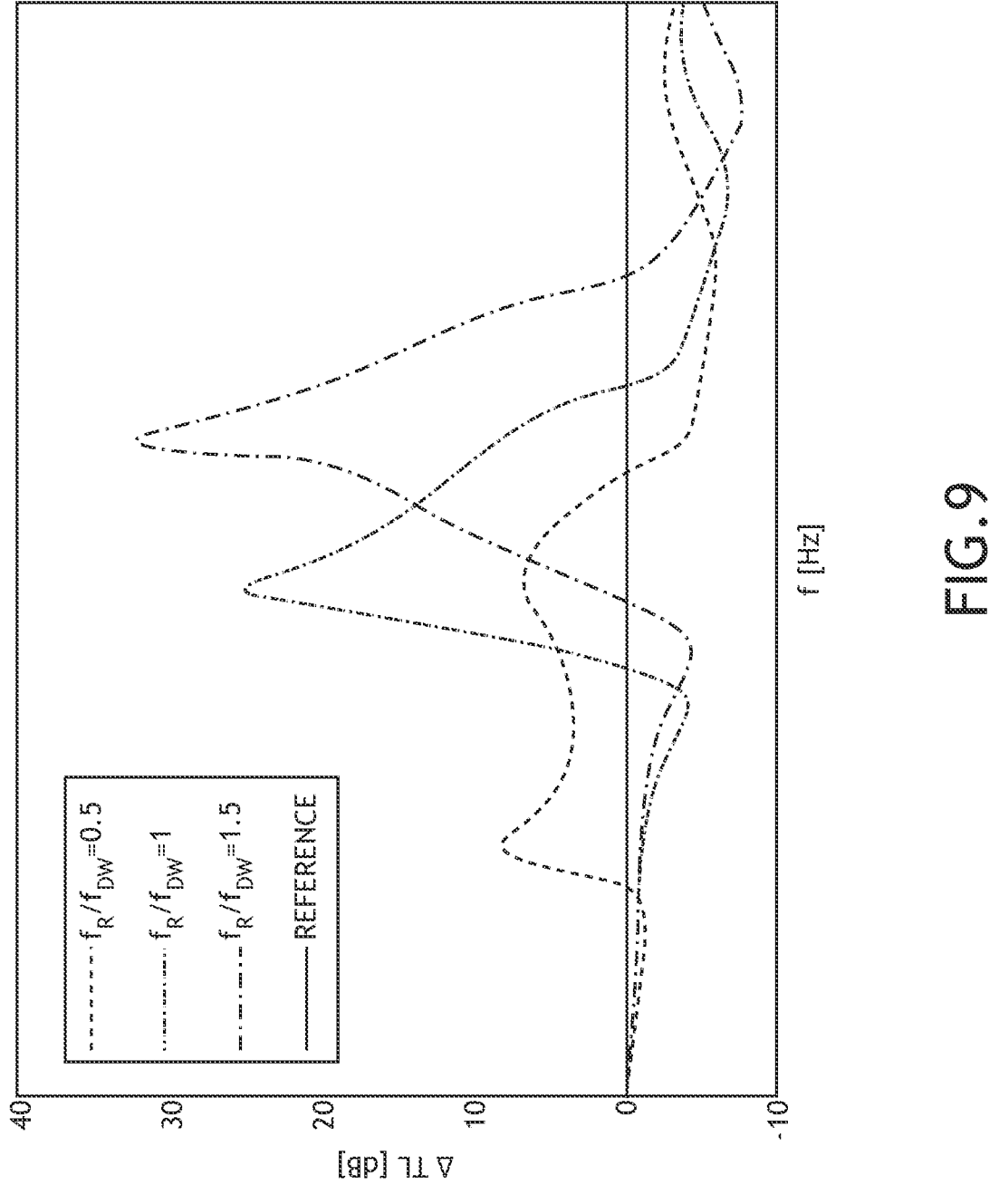
FIG. 9 shows graphs of frequency response in resonator panels according to exemplary embodiments.

Referring to FIG. 9, graphs of frequency response in resonator panels according to exemplary embodiments are shown. Panels according to the inventive concepts described herein may be tuned to be most operative with certain frequency ranges. In at least one embodiment, resonators are tunable to produce transmission absorption at low frequencies that may generally correspond to known engine noise. Panels with such resonators may be less effective at absorbing higher frequencies, or even less effective than a panel without a resonator. In such embodiments, a bulk absorber may enable a panel to absorb those higher frequencies, at least as well as existing panels, and with additional thermal insulating properties.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A panel resonator comprising:
   a plurality of regularly spaced cells, the plurality of regularly spaced cells formed in a single sheet layer comprising a thermoformed material, each cell defining an internal space, the plurality of regularly spaced cells configured to at least partially define an airgap between a first sidewall of a panel and the resonator,
   wherein the regularly spaced cells are configured to be disposed on and mechanically attached to an internal surface of a second sidewall of the panel such that the single sheet layer is disposed between the first sidewall and the second sidewall.

2. The panel resonator of claim 1, wherein at least one of the regularly spaced cells defines an opening to allow air movement from the internal space.

3. The panel resonator of claim 2, wherein:
the opening comprises a hole having a first diameter;
at least one of the regularly spaced cells defines a hole having a second diameter different from the first diameter; and
the first diameter and the second diameter are tuned for specific, different frequency ranges.

4. The panel resonator of claim 1, wherein at least two of the regularly spaced cells are in fluid communication with each other via a duct formed in the single sheet layer.

5. The panel resonator of claim 4, wherein one of the at least two regularly spaced cells defines an opening to allow air movement from the internal space.

6. The panel resonator of claim 1, further comprising a membrane layer configured to surround top portion of each of the regularly spaced cells to define a second internal space.

7. An aircraft panel comprising:
a first sidewall;
a second sidewall; and
a resonator disposed between the first sidewall and second sidewall, the resonator comprising a plurality of regularly spaced cells, the resonator comprising a single sheet layer formed into the plurality of cells, each cell defining an internal space,
wherein:
the resonator is disposed on the second sidewall and at least partially define an airgap between the first sidewall and the resonator and the single sheet layer comprises a thermoformed material.

8. The aircraft panel of claim 7, wherein at least one of the regularly spaced cells defines an opening to allow air movement from the internal space.

9. The aircraft panel of claim 8, wherein:
the opening comprises a hole having a first diameter;
at least one of the regularly spaced cells defines a hole having a second diameter different from the first diameter; and
the first diameter and the second diameter are tuned for specific, different frequency ranges.

10. The aircraft panel of claim 7, wherein at least two of the regularly spaced cells are in fluid communication with each other.

11. The aircraft panel of claim 7, further comprising a filler material at least partially filling the airgap.

12. The aircraft panel of claim 11, wherein the filler material is configured to a frequency range of vibrations.

13. The aircraft panel of claim 7, wherein the filler material is configured as a thermal insulator.

14. A mobile platform comprising:
a plurality of panels, each comprising:
a first sidewall;
a second sidewall; and
a resonator disposed between the first sidewall and second sidewall, the resonator comprising a plurality of regularly spaced cells, the plurality of regularly spaced cells formed in a single sheet layer comprising a thermoformed material, each cell defining an internal space,
wherein:
the resonator is disposed on the second sidewall and at least partially defines an airgap between the first sidewall and the resonator.

15. The mobile platform of claim 14, wherein at least one of the regularly spaced cells defines an opening to allow air movement from the internal space.

16. The mobile platform of claim 15, wherein:
the opening comprises a hole having a first diameter;
at least one of the regularly spaced cells defines a hole having a second diameter different from the first diameter; and
the first diameter and the second diameter are tuned for specific, different frequency ranges.

17. The mobile platform of claim 14, wherein at least two of the regularly spaced cells are in fluid communication with each other.

18. The mobile platform of claim 14, further comprising a filler material at least partially filling the airgap, configured to a frequency range of vibrations.

19. The mobile platform of claim 18, wherein the filler material is configured as a thermal insulator.

20. The mobile platform of claim 14, wherein the first sidewall, second sidewall, and resonator are curved to conform to a portion of the mobile platform.

* * * * *